US007447899B2

(12) United States Patent
Lu

(10) Patent No.: US 7,447,899 B2
(45) Date of Patent: Nov. 4, 2008

(54) METHOD FOR CONSERVING SYSTEM RESOURCES

(75) Inventor: Ying-Chih Lu, Taipei (TW)

(73) Assignee: Inventec Corporation (TW)

( * ) Notice: Subject to any disclaimer, the term of this patent is extended or adjusted under 35 U.S.C. 154(b) by 477 days.

(21) Appl. No.: 11/395,371

(22) Filed: Mar. 30, 2006

(65) Prior Publication Data

US 2007/0234025 A1 Oct. 4, 2007

(51) Int. Cl.
*G06F 15/177* (2006.01)
*G06F 9/00* (2006.01)
*G06F 1/24* (2006.01)
(52) U.S. Cl. .................. 713/2; 713/1; 713/100
(58) Field of Classification Search ............. 713/1, 713/2, 100
See application file for complete search history.

(56) References Cited

U.S. PATENT DOCUMENTS

| 5,038,320 | A | * | 8/1991 | Heath et al. | ............. 710/10 |
| 5,237,690 | A | * | 8/1993 | Bealkowski et al. | ........ 713/100 |
| 5,497,490 | A | * | 3/1996 | Harada et al. | ............ 713/100 |
| 5,712,472 | A | * | 1/1998 | Lee | ........................ 235/486 |
| 7,191,275 | B2 | * | 3/2007 | Arackal et al. | .......... 710/302 |

\* cited by examiner

*Primary Examiner*—Rehana Perveen
*Assistant Examiner*—Stefan Stoynov
(74) *Attorney, Agent, or Firm*—Peter F. Corless; Steven M. Jensen; Edwards Angell Palmer & Dodge LLP

(57) ABSTRACT

A method for conserving system resources applicable to an electronic system with a BIOS, a first memory unit and a second memory unit is proposed. The electronic system is connected to a riser card with a plurality of slots disposed thereon for receiving a plurality of slot cards. The method allows bridges corresponding to slots of a riser card that have slot cards inserted therein to be enabled, and those bridges corresponding to empty slots of a riser card not to be enabled. This information is recorded in the first memory unit. When the BIOS performs a Plug-and-Play (PnP) algorithm, the bridges that are not enabled are hidden away and cannot be accessed by a bus interface cycle. Thus, system resources such as interrupt request (IRQ), input/output (IO) and memory-mapped input/output (MMIO) are assigned only to the enabled bridges, conserving the system resources.

8 Claims, 1 Drawing Sheet

METHOD FOR CONSERVING SYSTEM RESOURCES

FIELD OF THE INVENTION

The present invention relates to a method for conserving system resources, and more particularly, to a method for conserving system resources by efficiently distributing width of bus interfaces.

BACKGROUND OF THE INVENTION

Along with the advancement in electronic and computer technologies, more and more functions can be realized. With new add-in peripheral devices, functions can even be upgraded or added. However, after a new peripheral device is connected, the computer system needs to be restarted in order to complete the installing of the peripheral device, which requires stopping of all current operations. In actual implementation, this is very inconvenient, and especially for devices such as servers that demand high reliability and continuity, this may cause adverse effects such as data lost or service interrupted.

Thus, a hot-pluggable slot card technique called PCI (Peripheral Component Interconnection) technique used as an Input/Output (I/O) interface for a computer system has been proposed in the industry. PCI is now a bus standard widely supported by today's computer systems.

PCI is a peripheral connecting interface usually adopted by computer platform that allows the CPU of the computer platform to outwardly extend and connect to a circuit board. Through this circuit board, the CPU can be connected to a variety of computer peripheral device, for example, a display, a hard disk drive, a CD-ROM, a network switch and so on, and exchange data therewith. The PCI specification has set forth a set of standard bus signals for the CPU to communicate with the peripheral devices on the circuit board. With the maturity and further development, the PCI specification has included other extended specification, such as PCI-X and PCI-E (PCI-Express), which has additional functionalities extended from the original PCI architecture, such as allowing higher data transmission speed than that of a PCI bus.

One characteristic of the PCI-E bus architecture is that it supports expansion card with different bus width, including 1-bit (x1), 4-bit (x4), 8-bit (x8) and 16-bit (x16) bus width. In actual implementation, expansion card with smaller bus width can be inserted into one with larger bus width. For example, a 4-bit expansion card not only is able to insert into a 4-bit slot, but also an 8-bit or 16-bit slot. In other words, if a computer motherboard is provided with 8-bit slots, then the slots can be selectively inserted with 8-bit or 4-bit expansion card.

However, in actual implementation, the above-mentioned PCI-E bus architecture has one drawback explained as follows. Assuming a PCI-E interface controller of a computer motherboard is an 8-bit bus, there are two ways for connecting the 8-bit bus. The first is to connect all 8 bits of the bus to an 8-bit slot. The second is to divide the bus into two 4-bit buses, each connected to a different slot. Now if the second approach is adopted, then only a 4-bit bus width can be utilized regardless how many expansion cards are inserted. That is, if only one expansion card is inserted, only a bus width of 4 bits instead of 8 bits is available for data transmission. Obviously, under the circumstance that only one expansion card is inserted, the system resources cannot be efficiently utilized for data transmission.

Moreover, when a slot is arranged on the PCI-E interface controller on a computer motherboard, regardless of whether an expansion card is actually inserted in the PCI-E interface, the computer system will always assign system resources (e.g. IO, MMIO, IRQ) to the bridges of the PCI-E interface, even for those bridges that do not have an expansion card thereon. If the BIOS is forced to not assign any system resources to the bridges of the PCI-E interface without expansion card inserted thereon, then error message may appear on the OS (e.g. MPS mode of MS Windows 2000, 2003®) of the computer device.

Thus, there is a need for a method that enhances data transmission speed while conserving system resources.

SUMMARY OF THE INVENTION

In the light of forgoing drawbacks, an objective of the present invention is to provide a method for conserving system resources that allows a bus interface to support maximum bus width of an expansion slot.

Another objective of the present invention is to provide a method for conserving system resources that allows a bus interface to conserve system resources.

Still another objective of the present invention is to provide a method for conserving system resources that does not generate error messages.

In accordance with the above and other objectives, the method for conserving system resources of the present invention is applied to an electronic system with a BIOS (Basic Input/Output System) program, a first memory and a second memory. The electronic system is connected to a detachable card with a plurality of slots disposed thereon for receiving a plurality of slot cards, the method comprising the following steps: (1) allowing the BIOS to perform a POST (Power On Self-Test) program; (2) determining whether data in the first memory unit is invalid, if so, go to step (3), else, go to step (4); (3) determining an identification code of the detachable card, so as to determine and record bridges corresponding to all the slots on the detachable card in the first memory unit; (4) enabling the bridges that are recorded in the first memory unit; (5) allowing the enabled bridges to communicate with buses that are controlled by them, and determining the width of the corresponding buses; (6) determining an identification code of the detachable card, so as to determine the bridges corresponding to the slots on the detachable card that are inserted with the slot card and record these bridges in the second memory unit; (7) determining whether the bridges recorded in the first memory unit equal to the bridges in the second memory unit, if so, proceed to step (8), else, go to step (9); (8) allowing the BIOS to perform a Plug-and-Play (PnP) algorithm so that the system resources are assigned to the buses with the enabled bridges, then, end the method; and (9) overwriting the bridges in the first memory unit with the bridges in the second memory unit and resetting the electronic system, then return to step (1).

In one embodiment, the buses are PCI (PCI-E) buses and/or PCI-E buses. The detachable card is a riser card. The slot cards are selected from the group consisting of a floppy disk drive, a hard disk drive, a Compact Disc-Read Only Memory (CD-ROM), a Compact Disc-Read/Write (CD-R/W), a Digital Versatile Disc (DVD), an audio card and a network card.

In addition, the first memory unit is a non-volatile memory. The non-volatile memory is one selected from the group consisting of a Complimentary Metal Oxide Semiconductor (CMOS), an Electrical Erasable Programmable Read Only Memory (EEPROM) and a flash ROM.

The second memory is a Random Access Memory (RAM) capable of read and write operations.

Thus, the method for conserving system resources of the present invention allows the bridges corresponding to slots of a riser card that have slot cards inserted therein to be enabled, and those bridges corresponding to empty slots of a riser card not to be enabled. At the end, this information is recorded (or overwritten) in the first memory unit. In one embodiment, the enabled bridges are recorded, for example, having a bit value of one in the first memory unit. Thereafter, when the BIOS performs the Plug-and-Play (PnP) algorithm, the bridges that are not enabled are hidden away and cannot be accessed by a bus interface cycle (e.g. a PCI cycle). Thus, system resources such as interrupt request (IRQ), input/output (IO) and memory-mapped input/output (MMIO) are assigned only to the enabled bridges, so system resources are conserved.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

Figure 1:
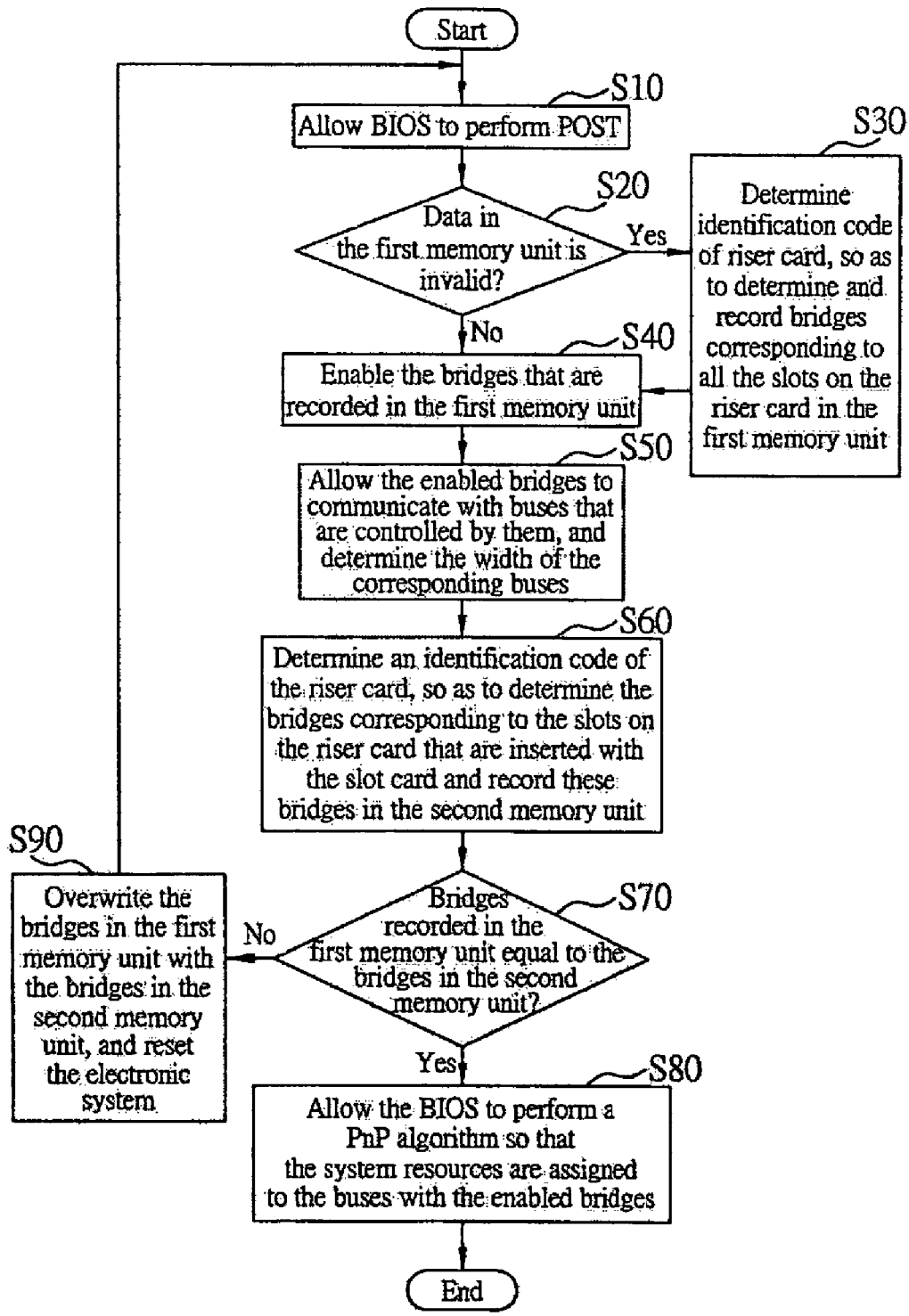
FIG. 1 is an operational flowchart showing a method for conserving system resources of the present invention.

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

FIG. 1 is an operational flowchart showing the method for conserving system resources of the present invention. The method for conserving system resources of the present invention can be applied to a computer system with a BIOS program. The computer system includes a motherboard comprising slots, such as PCI slots or/and special slots, in which a riser card may be inserted. The riser card contains several slots for receiving slot cards. The riser card operates as an extension to the slots on the motherboard. In this embodiment, the bus interface is a PCI (PCI-E) interface or PCI-E interface. The slot cards are for example PCI (PCI-E) cards or PCI-E cards, which may include floppy disk drive, hard disk drive, CD-ROM, CD-R/W, DVD, audio card, network card and so on.

In this embodiment, the computer system may further include a first memory unit and a second memory unit. The first memory unit may be a non-volatile memory, for example, a CMOS (Complimentary Metal-Oxide Semiconductor), an EEPROM (Electrical Erasable Programmable Read Only Memory), a flash ROM. The second memory unit may be a standard RAM (Random Access Memory) capable of read/write operations.

As shown, in step S10, allowing the BIOS to perform a POST (Power On Self-Test) program. Then, go to step S20.

In step S20, determining whether data in a first memory unit is invalid, if so, go to step S30; else, go to step S40.

In step S30, determining an identification code of a riser card to identify the riser card currently inserted, determining bridges corresponding to all the slots on the riser card, and recording them in the first memory unit. Then, proceed to step S40.

In step S40, enabling the bridges corresponding to the values recorded in the first memory unit. Then, proceed to step S50.

In step S50, allowing all the enabled bridges to start communicating with buses that are controlled by them, and determining the width of the corresponding buses. Next, go to step S60.

In step S60, determining an identification code of a riser card to identify the riser card currently inserted, determining and recording the slots on the riser card that are inserted with a slot card in the second memory unit. Then, proceed to step S70.

In step S70, determining whether the bridges recorded in the first memory unit equal those recorded in the second memory unit, if so, proceed to step S80; else, proceed to S90.

In step S80, allowing the BIOS to perform a PnP algorithm, so that system resources are assigned to the buses with enabled bridges. The method then ends.

In step S90, overwriting the bridges recorded in the first memory unit with those recorded in the second memory unit, and resetting the system. Then, repeat from step S10 again.

Thus, the method for conserving system resources of the present invention allows the bridges corresponding to slots of a riser card that have slot cards inserted therein to be enabled, and those bridges corresponding to empty slots of a riser card not to be enabled. At the end, this information is recorded (overwritten) in the first memory unit. In one embodiment, the enabled bridges are recorded, for example, having a bit value of one in the first memory unit. Thereafter, when the BIOS performs the PnP algorithm, the bridges that are not enabled are hidden away and cannot be accessed by a bus interface cycle (e.g. a PCI cycle). Thus, system resources such as interrupt request (IRQ), input/output (IO) and memory-mapped input/output (MMIO) are assigned only to the enabled bridges, so system resources are conserved.

Furthermore, when the bridges of the buses are enabled, the bus width of these buses is adjusted such that the bus interfaces support the maximum bus width of the corresponding slots on the riser card in order to achieve the maximum efficiency and data transmission speed possible.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A method for conserving system resources of an electronic system with a BIOS, a first memory unit and a second memory unit, the electronic system being connected to a detachable card with a plurality of slots disposed thereon for receiving a plurality of slot cards, the method comprising the steps of:

(1) allowing the BIOS to perform a POST (Power On Self-Test) program;

(2) determining whether data in the first memory unit is invalid, if so, going to step (3), else, going to step (4);

(3) determining an identification code of the detachable card, so as to determine and record bridges corresponding to all the slots on the detachable card in the first memory unit;

(4) enabling the bridges that are recorded in the first memory unit;

(5) allowing the enabled bridges to communicate with buses that are controlled by them, and determining width of the corresponding buses;
(6) determining an identification code of the detachable card, so as to determine the bridges corresponding to the slots on the detachable card that are inserted with the slot cards and record these bridges in the second memory unit;
(7) determining whether the bridges recorded in the first memory unit equal to the bridges in the second memory unit, if so, proceeding to step (8), else, going to step (9);
(8) allowing the BIOS to perform a Plug-and-Play (PnP) algorithm so that the system resources are assigned to the buses with the enabled bridges, and then, ending the method; and
(9) overwriting the bridges in the first memory unit with the bridges in the second memory unit and resetting the electronic system, then returning to step (1).

2. The method for conserving system resources of claim 1, wherein the buses are at least one of PCI (PCI-X) buses and PCI-E buses.

3. The method for conserving system resources of claim 1, wherein the detachable card is a riser card.

4. The method for conserving system resources of claim 1, wherein the slot cards are selected from the group consisting of a floppy disk drive, a hard disk drive, a Compact Disc-Read Only Memory (CD-ROM), a Compact Disc-Read/Write (CD-R/W), a Digital Versatile Disc (DVD), an audio card and a network card.

5. The method for conserving system resources of claim 1, wherein the first memory unit is a non-volatile memory.

6. The method for conserving system resources of claim 5, wherein the non-volatile memory is one selected from the group consisting of a Complimentary Metal Oxide Semiconductor (CMOS), an Electrical Erasable Programmable Read Only Memory (EEPROM) and a flash ROM.

7. The method for conserving system resources of claim 1, wherein the second memory unit is a Random Access Memory (RAM) capable of read and write operations.

8. The method for conserving system resources of claim 1, wherein the system resources comprise interrupt request (IRQ), input/output (IO) and memory-mapped input/output (MMIO).

* * * * *